(No Model.)

M. F. BEAN.
TROLLEY WIRE FROG.

No. 563,546. Patented July 7, 1896.

Witnesses:
J. M. Garfield
H. J. Clemons

Inventor
Merril F. Bean,
by Chapin &
Attorneys.

UNITED STATES PATENT OFFICE.

MERRILL F. BEAN, OF SPRINGFIELD, MASSACHUSETTS.

TROLLEY-WIRE FROG.

SPECIFICATION forming part of Letters Patent No. 563,546, dated July 7, 1896.

Application filed January 29, 1896. Serial No. 577,283. (No model.)

*To all whom it may concern:*

Be it known that I, MERRILL F. BEAN, a citizen of the United States, residing at Springfield, in the county of Hampden and State of Massachusetts, have invented new and useful Improvements in Trolley-Wire Frogs, of which the following is a specification.

This invention relates to trolley-wire frogs, the object being to provide an improved frog connection for trolley-wires whereby the trolley carried by a car is properly directed from the main line to a branch or branches therefrom, and vice versa, without danger of displacement of the trolley relative to either track on the frog, in passing from one line to another; and the invention consists in the peculiar construction and arrangement of the several trolley-frog tracks at their adjoining extremities on the body of the frog, and of the trolley-guards located near said extremities.

Figure 1:
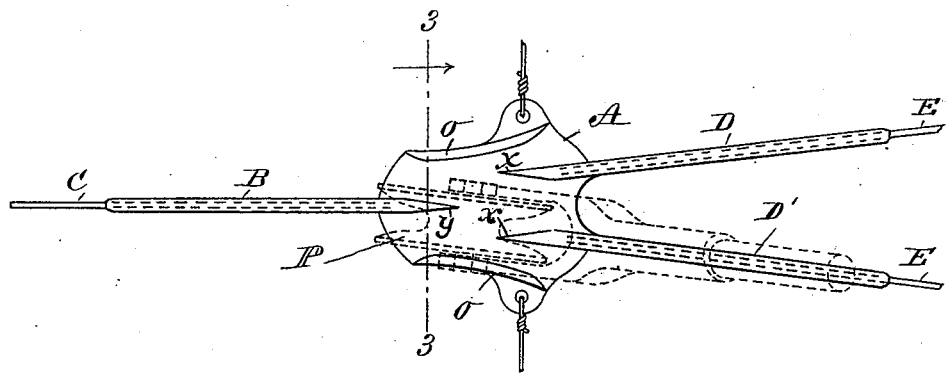
Figure 2:
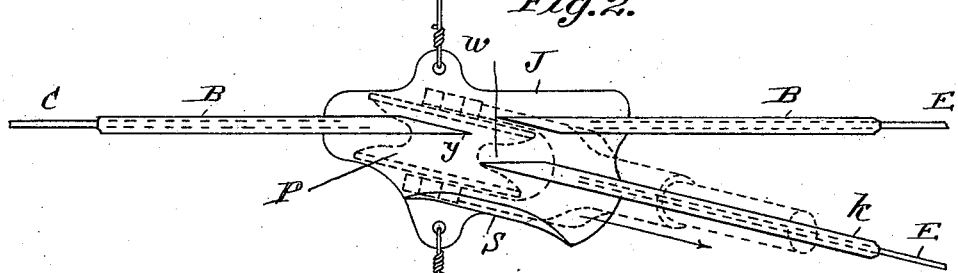
Figure 3:
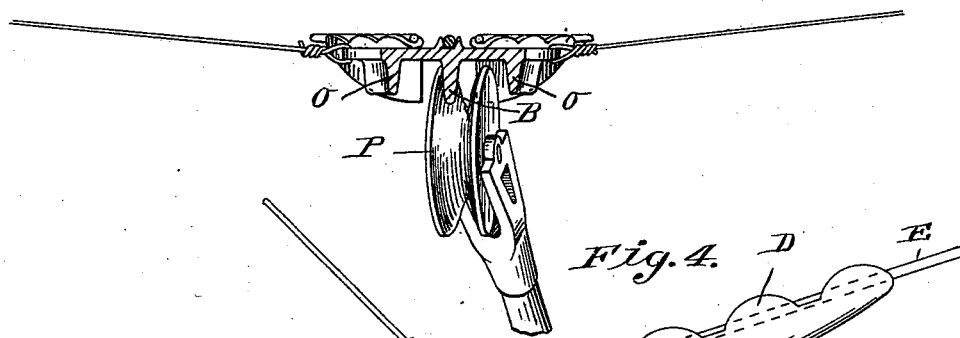
Figure 4:
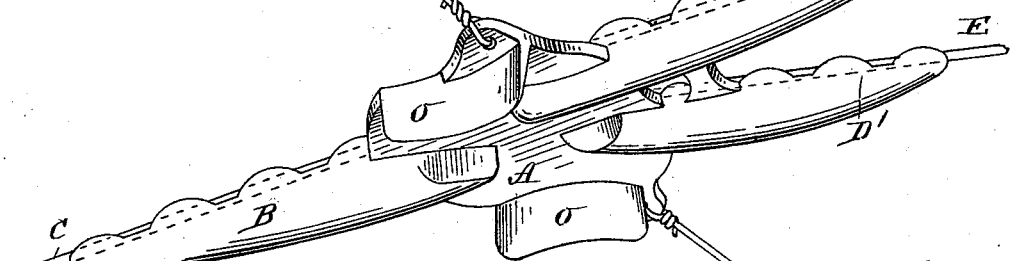

In the drawings forming part of this specification, Figures 1 and 2 are plan views of the track-bearing sides of trolley-wire frogs constructed according to my invention, said figures showing in dotted lines an ordinary trolley outlined upon the adjoining extremities of the trolley-track of said frog. Fig. 3 is a section on line 3 3, Fig. 1, showing the frog in its operative position and a trolley in connection therewith and a portion of the trolley-arm. Fig. 4 is a perspective view illustrating the construction shown in Fig. 2 in a suspended operative position.

In the drawings, referring to Fig. 1, A indicates the central body portion of the trolley-wire frog.

B indicates the main-line trolley-track of the frog, and C a portion of the trolley-wire of the main line connected to said track B, the latter extending over the surface of said body A, as shown, and terminating in a point $y$.

D D', Fig. 1, are branch tracks from said body A, to which are connected the branch trolley-wires E E, the extremities $x\ x$ of said tracks D D' extending over the body A of the frog into close proximity to the said point $y$ and having tapered ends, as usual. The guards $o\ o$ of said body A are arranged in such relation to the said pointed or tapering extremities of the tracks D D' as to properly guard and guide the trolley-wheel when passing from or onto either of the several track points of the frog, as below described. The arrangement of the said track points $y\ x\ x$ on the body A of the frog, Fig. 1, is such as to adapt them to coöperate with a trolley P, (indicated in dotted lines on said body A,) of a suitable thickness and diameter, aided by one of the guards $o\ o$, according to the direction which the trolley is taking, whether to the right or to the left, when passing from the main-line track B onto one of the branch tracks D'. In said Fig. 1 the trolley there indicated in dotted lines, as aforesaid, shows the operative position of a trolley when leaving the point $y$ of track B and entering upon the point $x$ of the track D'. By reference to the position of said trolley P in Fig. 1, as there indicated, it will be seen that the point $y$ of the track B enters into engagement with one of the flanges of said trolley, and reaches nearly to the axis of the latter, and that the point $x$ of the track D' is also engaged by the opposite flange of said trolley and reaches also nearly to the axis thereof, and that the guard $o$ lies close to one side of said trolley. Therefore, because of the immediate engagement of the said trolley with said point $x$ of the track D', when passing from the point of track B, and before the trolley shall have been disengaged from the point of the last-named track, and because of the presence of said guard $o$ at the side of the trolley, the latter cannot miss taking the branch direction which is given to the trolley by the usual advance diverging movement of the car on which said trolley is carried, operated by the usual track-switch. It therefore follows that in consequence of the approachment of the adjoining points of the track B D or B D' to such mutual positions results in bringing said track points mutually within the circumferential groove of the trolley P, while the latter passes from one onto the other, as above described. Consequently the trolley is caused, inevitably, to be fully engaged by the point of one track before it shall be disengaged from the main track, and vice versa, and therefore the proper direction of the trolley from said main track to the branch is assured, and the trolley is prevented from missing its "switch," as it is so termed, or leaving either track entirely when running from one track to another.

As heretofore constructed and arranged, the adjoining points of the different tracks upon the body portion of a trolley-frog has not been such as to insure the operation of the trolley as above described; and therefore since the usual swaying or jolting motion of the car on which a trolley is carried imparts a lateral swaying motion to the extremity of the trolley-arm and trolley, without a mutual interlocking of the points of a main track and a branch track with the trolley, while the latter is passing from one to the other, the trolley is often thrown entirely off from every track and swings free; but with the herein-described trolley-interlocking parts of the various tracks the effect of such jolting or swaying motion of the car upon the trolley as it passes over the frog is entirely obviated.

Referring now to Fig. 2, this figure illustrates the main line B and portions of its wire connection of a trolley-frog, in which J is the body thereof, and $k$ is a branch line. In this figure the trolley P is also indicated in dotted lines in the position which it takes in moving in a direction indicated by the arrow in this figure, that is to say, passing from said main line B onto said branch line $k$. $s$ indicates the trolley-guard on said body J. It will be observed by reference to Fig. 2, as it was by reference to Fig. 1, that the point $y$ of the main line B is fully engaged with the flange of the trolley P, while the latter is fully engaged with the point $w$ of the branch line $k$ while passing in the above-mentioned direction; and that the guard $s$ on the body J, adjoining the side of said trolley toward which guide the trolley is moving, serves to direct the trolley, together with the engagement of the latter in its said points $w$ and $y$, in such a manner that the trolley must follow the direction of the track-lines, irrespective of any swaying movement of the car and trolley-arm, the tendency of which is to move the trolley laterally from said track.

It is obvious that the same principles of engagement of the points of the branches and main lines of the tracks and of the trolley are enforced in whatever direction the trolley may be passing over the frog, and it will be understood from the above description that the trolley is never disengaged from one point before it engages with the coming one; and hence the trolley is, as aforesaid, positively engaged to the proper track in whichever direction it may be conducted.

Having thus described my invention, what I claim, and desire to secure by Letters Patent, is—

A trolley-frog for trolley-wire lines consisting of a body, a main-line track and one or more branch-line tracks in which the adjoining points of said tracks on the surface of said body approach each other with such degree of proximity that they are mutually engaged within the circumferential groove of the trolley, at the instant of the passage of the latter from one of said points onto the other, combined with suitable trolley-guards on said body for engagement with a side of said trolley during its said movement from and onto a point of said tracks, substantially as set forth.

MERRILL F. BEAN.

Witnesses:
H. A. CHAPIN,
K. I. CLEMONS.